United States Patent
Kathpal et al.

(10) Patent No.: US 9,501,485 B2
(45) Date of Patent: Nov. 22, 2016

(54) METHODS FOR FACILITATING BATCH ANALYTICS ON ARCHIVED DATA AND DEVICES THEREOF

(71) Applicant: NetApp, Inc., Sunnyvale, CA (US)

(72) Inventors: Atish Kathpal, Bangalore (IN); Giridhar Appaji Nag Yasa, Bangalore (IN)

(73) Assignee: NETAPP, INC., Sunnyvale, CA (US)

(*) Notice: Subject to any disclaimer, the term of this patent is extended or adjusted under 35 U.S.C. 154(b) by 256 days.

(21) Appl. No.: 14/480,151

(22) Filed: Sep. 8, 2014

(65) Prior Publication Data

US 2016/0070766 A1    Mar. 10, 2016

(51) Int. Cl.
    *G06F 17/30*    (2006.01)

(52) U.S. Cl.
    CPC .............. *G06F 17/30073* (2013.01)

(58) Field of Classification Search
    CPC ............ G06F 17/30563; G06F 17/30073; G06F 17/30; G06F 17/00
    USPC ................................................. 707/600–899
    See application file for complete search history.

(56) References Cited

U.S. PATENT DOCUMENTS

2013/0238561 A1*    9/2013    Subramaniam ..... G06F 21/6227
                                                                    707/647

OTHER PUBLICATIONS

Dean, J. et al., "MapReduce: Simplified Data Processing on Large Clusters", Communications of the ACMS 51.1, pp. 1-13 (2008).
McKenna, A. et al., "The Genome Analysis Toolkit: A MapReduce Framework for Analyzing Next-Generation DNA Sequencing Data", Genome Research 20.9, pp. 1297-1303 (2010).
Borthakur, D. et al., "HDFS Architecture Guide", Hadoop Apache Project http://hadoop.apache.org/common/docs/r1.04/hdfs-design.html, pp. 1-14 (2008).
White, T., "Hadoop: The Definitive Guide", O'Reilly Media, pp. 1-625 (2009).
Mihailescu, M. et al., "MixApart: Decoupled Analytics for Shared Storage Systems", retrieved from http://www.gokulsoundar.com/pdf/MihailescuHOTSTORAGE12.pdf on Jun. 10, 2015, pp. 1-5 (2012).

(Continued)

Primary Examiner — Isaac M Woo
(74) Attorney, Agent, or Firm — Klein, O'Neill & Singh, LLP (57) ABSTRACT

A method, non-transitory computer readable medium, and archive node computing device that receives an indication of each of a plurality of archived files required to service a job from one of a plurality of compute node computing devices of an analytics tier. An optimized schedule for retrieving the archived files from one or more archive storage devices of an archive tier is generated. The optimized schedule is provided to the one of the plurality of compute node computing devices. Requests for the archived files received from the one of the plurality of compute node computing device and at least one other of the plurality of compute node computing devices, wherein the requests are sent according to the optimized schedule.

15 Claims, 5 Drawing Sheets

(56) References Cited

OTHER PUBLICATIONS

Prabhakar, S. et al., "Optimal Scheduling Algorithms for Tertiary Storage", Distributed and Parallel Databases 14, pp. 255-282 (2003).
Adams, I. et al., "Usage Behavior of a Large-Scale Scientific Archive", Proceedings of the International Conference on High Performance Computing, Networking, Storage and Analysis, IEEE, pp. 1-11 (2012).
Pease, D. et al., "The Linear Tape File System", Mass Storage Systems and Technologies (MSST), IEEE, pp. 1-8 (2010).
Pundir, M. et al., "Towards Enabling Cooperation Between Scheduler and Storage Layer to Improve Job Performance", retrieved from http://www.pdsw.org/pdsw13/slides/lr/bellessa-lr-pdsw13.pdf on Jun. 11, 2015, pp. 1-9.
Rashmi, K. et al., "A Solution to the Network Challenges of Data Recovery in Erasure-Coded Distributed Storage Systems: A Study on the Facebook Warehouse Cluster", retrieved from http://www.eecs.berkeley.edu/~nihar/publications/hotstorage13.pdf on Jun. 10, 2015, pp. 1-5 (2013).
"HP LTO Ultrium Tape Drives Technical Reference Manual vol. 4: Specification", retrieved from http://docs.oracle.com/cd/E21419_03/en/LTO5_Vol4_E4/LTO5_Vol4_E4.pdf on Jun. 11, 2015, pp. 1-48 (2010).

* cited by examiner

METHODS FOR FACILITATING BATCH ANALYTICS ON ARCHIVED DATA AND DEVICES THEREOF

FIELD

This technology relates to performing batch analytics, and more particularly to methods and devices for more efficiently performing batch analytics, with compute node computing device(s) of an analytics tier, on archived data stored in an archive tier.

BACKGROUND

Analytics frameworks are often leveraged for processing large volumes of data to generate insights and information that drive business decisions and research. Such frameworks provide storage and large scale processing of datasets on clusters of servers in an analytics tier. Data is generally stored in an analytics tier in a distributed file system format and on relatively expensive and fast media for high parallel performance and relatively efficient processing.

However, entities are increasingly requiring long term retention of data for purposes of compliance, preservation, research, and other business needs, for example. Considering the relatively large volume of data increasingly being stored, and longer term of storage, less frequently accessed or archival data is often stored on less costly storage media in an archive tier. Storage media in an archive tier might include tapes and/or spun down disks, which are cheaper and require less energy than storage media present in an analytics tier. However, archive tier storage media is relatively slow and exhibits high time to first byte when responding to data retrieval requests. For example, tape libraries require that the media be loaded into an available tape drive before servicing data requests and spun down disks require time to power on.

Accordingly, multiple tiers of storage are generally used for retention of data, which introduces additional cost and inefficiencies when archived data needs to be analyzed using batch analytics platforms executed in an analytics tier. Currently, archive data is often copied from the archive tier to the analytics tier prior to the batch analytics platform operating on the data in order to service a job, which is commonly referred to as ingest-then-compute. The ingest-then-compute technique introduces significant delay and administrative overhead and requires significant additional storage space on the analytics tier to hold the copied data, which is undesirable.

In other implementations, archive tier storage media can be network file system (NFS) mounted and the analytics platform executed by the analytics tier can directly access the archive data. However, the high time to first byte of the archive tier storage media generally does not provide significant improvement in these implementations over the ingest-then-compute implementation. In yet other implementations, the analytics platform communicates the order archived files will be accessed to allow the archive tier to prefetch files. However, the efficiency gains provided by prefetching are limited by the inefficiencies of the archive storage media. In particular, prefetching archived files according to the communicated order still often results in relatively long time to first byte and seek delays depending on the archive data layout.

SUMMARY

A method for facilitating batch analytics on archived data, the method includes receiving, by an archive node computing device, an indication of each of a plurality of archived files from one of a plurality of compute node computing devices of an analytics tier. The archived files are required to service a job received by the one of the compute node computing devices. An optimized schedule for retrieving the archived files from one or more archive storage devices of an archive tier is generated by the archive node computing device. The optimized schedule is provided by the archive node computing device to the one of the compute node computing devices. Requests for the archived files received from the one of the plurality of compute node computing device and at least one other of the plurality of compute node computing devices, wherein the requests are sent according to the optimized schedule.

An archive node computing device comprising a processor coupled to a memory and configured to execute programmed instructions stored in the memory to perform steps including receiving an indication of each of a plurality of archived files required to service a job from one of a plurality of compute node computing devices of an analytics tier. An optimized schedule for retrieving the archived files from one or more archive storage devices of an archive tier is generated. The optimized schedule is provided to the one of the plurality of compute node computing devices. Requests for the archived files received from the one of the plurality of compute node computing device and at least one other of the plurality of compute node computing devices, wherein the requests are sent according to the optimized schedule.

A non-transitory computer readable medium having stored thereon instructions for facilitating batch analytics on archived data comprising executable code which when executed by a processor, causes the processor to perform steps including receiving an indication of each of a plurality of archived files required to service a job from one of a plurality of compute node computing devices of an analytics tier. An optimized schedule for retrieving the archived files from one or more archive storage devices of an archive tier is generated. The optimized schedule is provided to the one of the plurality of compute node computing devices. Requests for the archived files received from the one of the plurality of compute node computing device and at least one other of the plurality of compute node computing devices, wherein the requests are sent according to the optimized schedule.

A method for facilitating batch analytics on archived data, the method includes receiving, by a compute node computing device, a job to be performed on a plurality of files. A determination is made by the compute node computing device when a subset of the files includes archived files stored in an archive tier. An indication of each of the subset of the files is sent by the compute node computing device to an archive node computing device, when the subset of the files is determined to include archived files stored in an archive tier. An optimized schedule for retrieving the subset of the files is received by the compute node computing device and from the archive node computing device. The job is serviced by the compute node computing device at least in part by utilizing at least one or more other compute node computing devices to retrieve the subset of the files according to the optimized schedule.

A compute node computing device comprising a processor coupled to a memory and configured to execute programmed instructions stored in the memory to perform steps including receiving a job to be performed on a plurality of files. A determination is made when a subset of the files includes archived files stored in an archive tier. An indication of each of the subset of the files is sent to an archive node computing device, when the subset of the files is determined to include archived files stored in an archive tier. An optimized schedule for retrieving the subset of the files is received from the archive node computing device. The job is serviced at least in part by utilizing at least one or more other compute node computing devices to retrieve the subset of the files according to the optimized schedule.

A non-transitory computer readable medium having stored thereon instructions for facilitating batch analytics on archived data comprising executable code which when executed by a processor, causes the processor to perform steps including receiving a job to be performed on a plurality of files. A determination is made when a subset of the files includes archived files stored in an archive tier. An indication of each of the subset of the files is sent to an archive node computing device, when the subset of the files is determined to include archived files stored in an archive tier. An optimized schedule for retrieving the subset of the files is received from the archive node computing device. The job is serviced at least in part by utilizing at least one or more other compute node computing devices to retrieve the subset of the files according to the optimized schedule.

This technology provides a number of advantages including providing more efficient and effective methods, non-transitory computer readable medium, and devices for facilitating batch analytics on archived data. With this technology, an archive node computing device of an archive tier can generate an optimized schedule for retrieving archived files, as identified by a compute node computing device of an analytics tier, based on the archive data layout, for example. The optimized schedule can be used by the analytics tier executing the job to retrieve the archived files and, in parallel, the archive node computing device can prefetch the required archived files. Accordingly, archived files do not have to be copied into an analytics tier and jobs can be serviced relatively quickly and with reduced storage and administrative overhead.

DETAILED DESCRIPTION

Figure 1:
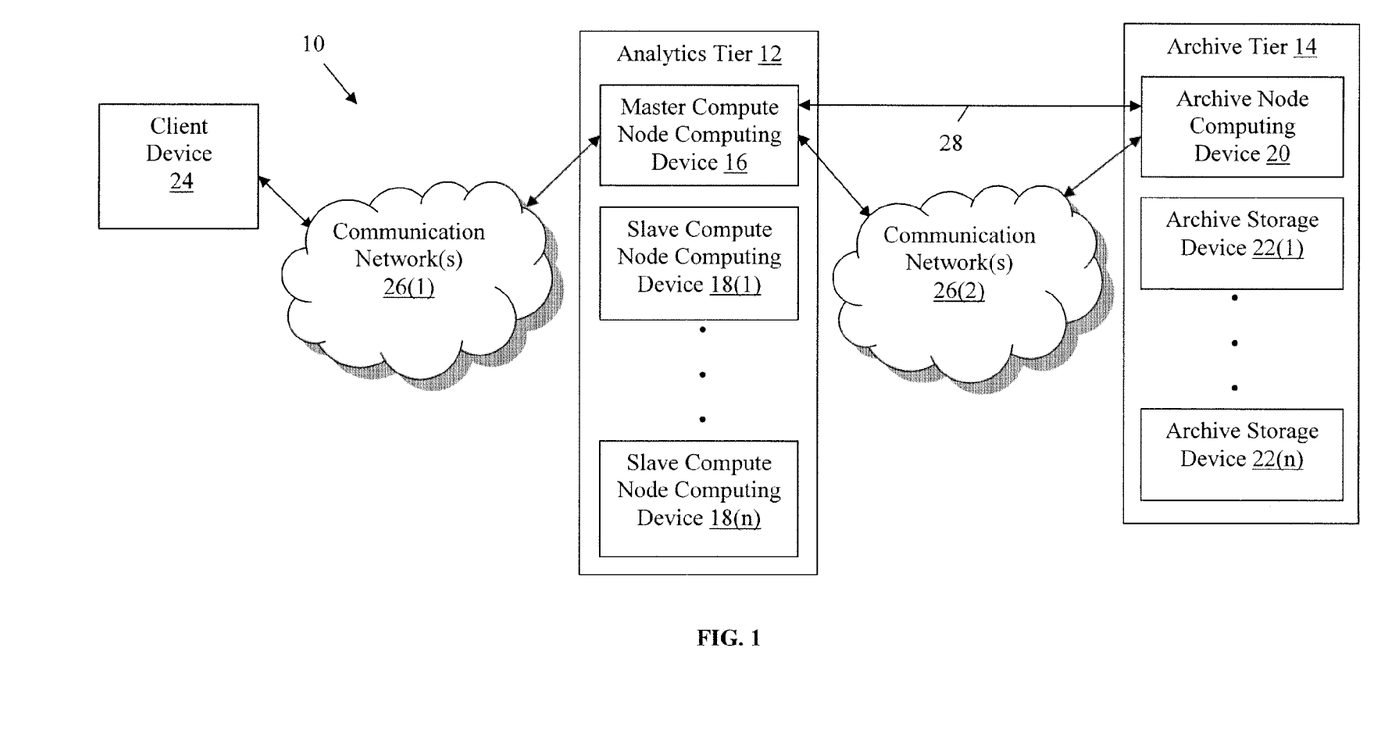
FIG. 1 a block diagram of a network environment with an exemplary analytics tier with a master compute node computing device and an exemplary archive tier with an archive node computing device.

A network environment 10 including an example of an analytics tier 12 and an archive tier 14 is illustrated in FIG. 1. The analytics tier 12 includes a master compute node computing device 16 and a plurality of slave compute node computing devices 18(1)-18(n). The archive tier 14 includes an archive node computing device 20 and a plurality of archive storage devices 22(1)-22(n). The environment 10 further includes a client device 24 from which batch analytics requests or jobs can be submitted, although this environment 10 can include other numbers and types of systems, devices, components, and/or elements in other configurations. The client device 24 communicates with the master compute node computing device 16 through the communication network(s) 26(1) in this example. Additionally, the master compute node computing device 16 communicates with the archive node computing device 20 through communication network(s) 26(2) and/or an optional out-of-band communication channel 28. This technology provides a number of advantages including methods, non-transitory computer readable media, and devices that facilitate relatively efficient processing of batch analytics jobs requiring archived data.

The client device 24 in this example can include a processor, a memory, a communication interface, an input device, and a display device, which are coupled together by a bus or other link, although the client device 24 can have other types and numbers of components or other elements and other numbers and types of network devices could also be used. The client device 24 may communicate with the master compute node computing device 16 through an interface to submit analytics jobs requiring access to files stored by the analytics tier 12 and/or the archive tier 14, for example, although analytics jobs can be submitted in other manners and by other types and numbers of devices. The client device 24 may be, for example, a conventional personal computer, a tablet computing device, a smart phone, or other processing and/or computing device.

Figure 2:
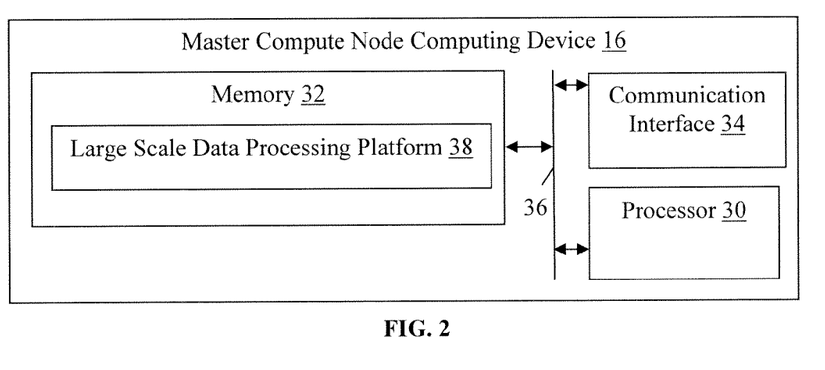
FIG. 2 is a block diagram of an exemplary master compute node computing device.

Referring to FIG. 2, a block diagram of the exemplary master compute node computing device 16 is illustrated. The master compute node computing device 16 is configured to interface with the archive node computing device 14, and the client device 24 in this example. Accordingly, the master compute node computing device 16 receives jobs and, in the event the job requires access to archived data, communicates with the archive node computing device 20 to service the request, as described and illustrated in more detail later.

In this example, the master compute node computing device 16 includes a processor 30, a memory 32, and a communication interface 34, coupled together by a bus 36 or other communication link. The processor 30 of the master compute node computing device 16 executes a program of stored instructions for one or more aspects of the present invention, as described and illustrated by way of the embodiments herein, although the processor 30 could execute other numbers and types of programmed instructions. The processor 20 in the master compute node computing device 16 may include one or more central processing units or general purpose processors with one or more processing cores, for example.

The memory 32 of the master compute node computing device 16 may include any of various forms of read only memory (ROM), random access memory (RAM), Flash memory, non-volatile, or volatile memory, or the like, or a combination of such devices for example. In this example, the memory 32 further includes a large scale data processing platform 38, such as Hadoop, an open-source software framework available from the Apache Software Foundation, for example, although other platforms and/or frameworks can also be used. The memory 32 can store files and other data that is more frequently used and/or relatively recently accessed, for example, in a relatively fast type of storage media and in a distributed file system, such as the Hadoop distributed file system (HDFS), for example.

The communication interface 34 of the master compute node computing device 16 in this example can include one or more network interface controllers (NICs) for operatively coupling and communicating between the client device 24 and the archive node computing device 20, which are coupled together by the communication network(s) 26(1) and 26(2), although other types and numbers of communication networks or systems with other types and numbers of connections and configurations to other devices and elements also can be used.

In order to service jobs received from the client device 24, the master compute node computing device 16 distributes archive data retrieval and other computational tasks to the slave compute nodes computing devices 18(1)-18(n). Accordingly, each of the slave compute node computing device 18(1)-18(n) includes a processor, a memory, and a communication interface, coupled together by a bus or other communication link. Additionally, the memory in each of the slave node computing devices 18(1)-18(n) also stores a large scale data processing platform such as Hadoop, which is distributed across the analytics tier 12 and facilitates the processing of batch analytics jobs.

Figure 3:
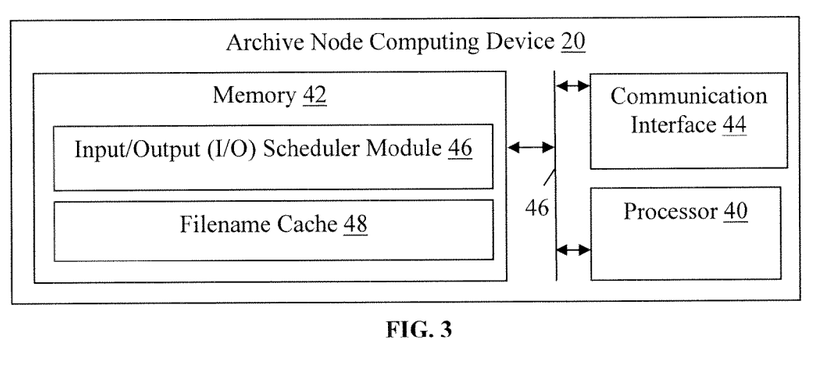
FIG. 3 is a block diagram of an exemplary archive node computing device.

Referring to FIG. 3, a block diagram of the exemplary archive node computing device 20 is illustrated. The archive node computing device 20 communicates with the master compute node computing device 16 to exchange information regarding archived files required to service a job, an optimized schedule for retrieving the archived files, and/or the archived files themselves, as described and illustrated in more detail later. Additionally, the archive node computing device 20 stores, retrieves, and manages files, or other units of data collectively referred to herein as files, on the archive storage devices 22(1)-22(n). Accordingly, the archive node computing devices 20 also receives and responds to various read and/or write requests directed to files stored in, or to be stored in, one or more of the archive storage devices 22(1)-22(n), such as received from the analytics tier 12, for example.

In this example, the archive node computing device 20 includes a processor 40, a memory 42, and a communication interface 44 coupled together by a bus 46 or other communication link. The processor 40 of the archive node computing device 20 executes a program of stored instructions for one or more aspects of the present invention, as described and illustrated by way of the embodiments herein, although the processor 40 could execute other numbers and types of programmed instructions. The processor 40 in the archive node computing device 20 may include one or more central processing units or general purpose processors with one or more processing cores, for example.

The memory 42 of the archive node computing device 20 may include any of various forms of read only memory (ROM), random access memory (RAM), Flash memory, non-volatile, or volatile memory, or the like, or a combination of such devices for example. In this example, the memory 42 includes an input/output (I/O) scheduler module 46 and a filename cache 48. The I/O scheduler module 46 is configured to generate an optimized schedule of retrieval of archived files stored by the archive storage devices 22(1)-22(n), as identified by the master compute node computing device 16, as described and illustrated in more detail later.

In this example, the filename cache 48 is NFS mounted by at least the master compute node computing device 16 and optionally each of the slave compute node computing devices 18(1)-18(n). The filename cache 48 can be a direct-attached disk cache portion of the memory 42, for example, although other types of storage media can be used for the portion of the memory 42 that comprises the filename cache 48. The filename cache 48 includes an indication of each of the archived files stored by the archive storage devices 22(1)-22(n). The filename cache 48 is accessible to the master compute node computing device 16 via the NFS mount and is used by the master compute node computing device 16 to determines whether files required to service a job are stored in the archive tier, as described and illustrated in more detail later.

The communication interface 44 of the archive node computing device 20 in this example can include one or more network interface controllers (NICs) for operatively coupling and communicating between the archive node computing device 20, the master compute node computing device 16 and the archive storage devices 22(1)-22(n), which are coupled together by the communication network(s) 26(2), although other types and numbers of communication networks or systems with other types and numbers of connections and configurations to other devices and elements also can be used.

Each of the archive storage devices 22(1)-(n) in this example can be a tape drive archive formatted with a linear tape file system format, one or more disks, and/or any other type of stable, non-volatile, relatively cheap but slow storage device suitable for storing large quantities of archived files for long term retention, for example. Accordingly, the archive storage devices 22(1)-22(n) store the archived files managed by the archive node computing device 20 and operatively provided to the master compute node computing device 16 and/or slave compute node computing devices 18(1)-8(n) via the communication network(s) 26(2) in order to service batch analytics jobs, as described and illustrated in more detail later.

By way of example only, the communication network(s) 22(1) and/or 22(2) and/or the out-of-band communication channel 28 can use TCP/IP over Ethernet and industry-standard protocols, including NFS, CIFS, SOAP, XML, LDAP, and SNMP, although other types and numbers of communication networks, can be used. The communication network(s) 22(1) and 22(2) and out-of-band communication channel 28 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The optional out-of-band communication channel 28 can be used by the master compute node computing device 16 and the archive node computing device 20 to exchange indications of archived files required to service a job and generated optimized schedules, for example, although the out-of-band communication channel 28 can be used for other purposes and the indications and optimized schedules can be communicated in other manners, such as via the communication network(s) 26(2).

Although examples of the master compute node computing device 16, slave compute node computing devices 18(1)-18(n), archive node computing device 20, archive storage devices 22(1)-22(n), and client device 24 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 4:
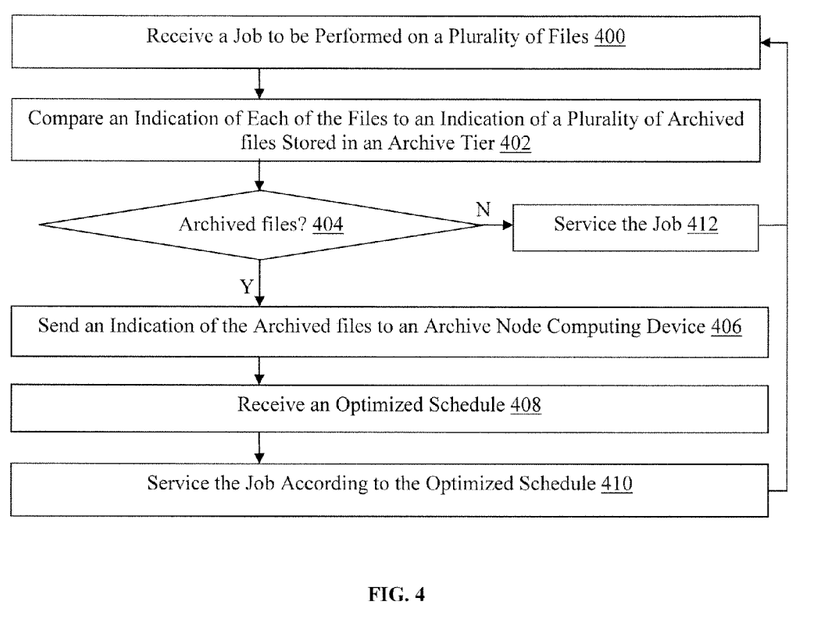
FIG. 4 is a flowchart of an exemplary method for processing a received job by a master compute node computing device of an analytics tier.

An exemplary method for facilitating batch analytics on archived data will now be described with reference to FIGS. 1-7. Referring more specifically to FIG. 4, an exemplary method for processing a received job by the master compute node computing device 16 of the analytics tier 12 is illustrated. In step 400 in this example, the master compute node computing device 16 receives a job to be performed on a plurality of files. An indication of each of the files can be included with the submission of, or request to perform, the job. The indication can include the file name of each of the files, for example, although other indications can also be used. The job can be received by the master compute node computing device 16 from the client device 24 through a provided interface and via communication network(s) 26(1), for example, although the job can be received from other devices and/or in other manners. The job can be associated with a batch analytics request, such as a request to analyze the files for research or commercial purposes, for example, although any type of job and/or batch analytics request can be used.

In step 402, the master compute node computing device 16 compares an indication of each of the files to an indication of a plurality of archived files stored in the archive tier 14, such as in one or more of the archive storage devices 22(1)-22(n), for example. In this example, the indications of the archived files are file names, although other indications can also be used. The file names of the archived files are stored in the filename cache 48 in the memory 42 of the archive node computing device 20. The master compute node computing device 16 has access to the file names of the archived files stored by the archive tier 14 via the filename cache 48, which is NFS mounted by the master computer node computing device 16, as described and illustrated earlier.

Accordingly, the master compute node computing device 16 compares, in step 402, the file names of the files identified in the received job to the archived file names in the filename cache 48 in order to determine, in step 404, whether any of the files required to service the job are archived files. If the master compute node computing device 16 determines that one or more of the files required to service the job are archived files, then the Yes branch is taken to step 406.

In step 406, the master compute node computing device 16 sends an indication of the archived files to the archive node computing device 20. Accordingly, in this example, the master compute node computing device 16 sends the file names of files required to service the job that match file names in the filename cache 48, and therefore correspond to archived files. Optionally, the indications of the archived files required to service the job can be sent by the master compute node computing device 16 to the archive node computing device 20 via the out-of-band communication channel 28, for example, although the communication network(s) 26(2) or any other channel or network can also be used.

In step 408, the master compute node computing device 16 receives an optimized schedule from the archive node computing device 20. The optimized schedule is generated by the archive node computing device 20, as described and illustrated in more detail later with reference to step 502 of FIG. 5. In this example, the optimized schedule includes a schedule that is used by the analytics tier 12 to retrieve the archived files required to service the job.

In step 410, the master compute node computing device 16 services the job according to the optimized schedule and using the large scale data processing platform 38. In this example, the master compute node computing device 16 distributes the archived file retrieval, and any associated computational tasks, to the slave compute node computing devices 18(1)-18(n) in an order based on the received optimized schedule, although other methods of retrieving the archived files required to service the job can also be used.

Referring back to step 404, if the master compute node computing device 16 determines that none of the files required to service the job are archived files, then the No branch is taken to step 412. In step 412, the master compute node computing device 16 services the job using the large scale data processing platform 38 and the slave compute node computing devices 18(1)-18(n) and without further interaction with the archive tier 14.

Figure 5:
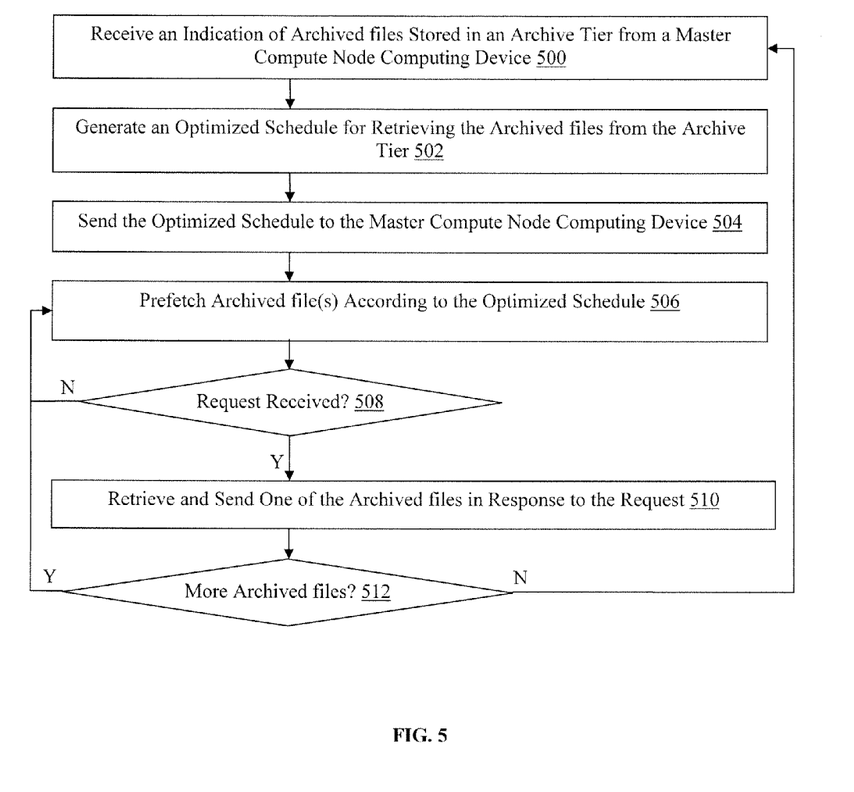
FIG. 5 is a flowchart of an exemplary method for facilitating by an archive node computing device the retrieval of archived data required for one or more compute node computing devices of an analytics tier to process a received job.

Referring more specifically to FIG. 5, an exemplary method for facilitating, by the archive node computing device 20, the retrieval of archived data required for the analytics tier 14 to process a received job is illustrated. In step 500 in this example, the archive node computing device 20 receives an indication of archived file(s) stored in the archive tier 14 from the master compute node computing device 16. The indications can be file names and the archived files can be required to service a job, such as a job received as described and illustrated earlier with reference to step 400 of FIG. 4. Accordingly, the file names of the archived files can be received by the archive node computing device 20 as sent by the master compute node computing device 16 as described and illustrated earlier with reference to step 406 of FIG. 4.

In step 502, the archive node computing device 20 generates an optimized schedule for retrieving, from the archive tier 14, the archived files corresponding to the indications received in step 500. In this example, the I/O scheduler module 46 of the archive node computing device 20 generates the optimized schedule based on its knowledge of the layout of the archived files and/or architecture of the archive tier 14.

For example, in a RAID or other redundant storage deployment of the archive storage devices 22(1)-22(n), the archive node computing device 20 generates the optimized schedule so as to give preference to one or more of the archive storage devices 22(1)-22(n) hosting an increased number of the archived files required to service the job. In another example, the archive node computing device 20 generates the optimized schedule so as to give preference to one or more of the archive storage devices 22(1)-22(n) that are currently active (e.g., powered on, loaded, or spun up). By retrieving archived files from fewer of the archive storage devices 22(1)-22(n) and/or from active ones of the archive storage devices 22(1)-22(n), load/unload cycles for the archive storage devices 22(1)-22(n) can be reduced.

In yet another example, the archive node computing device 20 generates the optimized schedule so as to order the retrieval of archived files on a same one of the archive storage devices 22(1)-22(n) based on seek location. In this example, archived files required to service the job and stored on one of the archive storage devices 22(1)-22(n) that is a disk will be retrieved in the seek order in which they are stored, thereby reducing seek delays. In yet another example, the archive node computing device 20 generates the optimized schedule based on the current load on the archive storage devices 22(1)-22(n) and/or the expected load on the archive storage devices 22(1)-22(n) resulting from the retrieval of the archived files. Other types and number of criteria can also be used to generate the optimized schedule for retrieving the archived files required to service the job.

In step 504, the archive node computing device 20 sends the optimized schedule generated in step 502 to the master compute node computing device 504. The optimized schedule can be sent using the out-of-band communication channel 28 or the communication networks 26(2), for example, although other methods and manners of communicating the optimized schedule can also be used.

In step 506, the archive node computing device 20 optionally prefetches one or more of the archived files according to the optimized schedule. The prefetched archived file(s) can be stored in a cache portion of the memory 42 of the archive node computing device 20, for example.

In step 508, the archive node computing device 20 determines whether a request for one of the archived files has been received from the analytics tier 12. Requests can be sent from the analytics tier 12 as part of servicing the job, as described and illustrated earlier with reference to step 410 of FIG. 4. Accordingly, requests can be sent from the master compute node computing device 16 and/or one or more of the slave compute node computing devices 18(1)-18(n) according to the optimized schedule. If the archive node computing device 20 determines that a request for one of the archived files has been received, then the Yes branch is taken to step 510.

In step 510, the archive node computing device 20 retrieves and sends the requested one of the archived files in response to the request. If the requested archived file has been prefetched, then the archive node computing device 20 can retrieve the archived file from the memory 42 of the archive node computing device 20. If the requested archived file has not been prefetched, then the archive node computing device 20 can retrieve the requested archived file from a location on one of the archive storage devices 22(1)-22(n), as identified in the request. Alternatively, if the requested archived file has been prefetched in step 506, then the archive node computing device 20 can retrieve the requested archived file from a cache portion of the memory 42, for example.

Subsequent to sending the requested one of the archived files to the master compute node computing device 16 or one or more of the slave compute node computing devices 18(1)-18(n), the archive node computing device 20 proceeds to step 512. In step 512, the archive node computing device 20 determines whether more archived files are required in order to service the job. The determination can be made based on the optimized schedule previously generated in step 502 and/or the indications received in step 500, for example.

If the archive node computing device 20 determines that more archived files are required to service the job, then the Yes branch is taken back to optional step 506 and the archive node computing device 20 continues to prefetch an additional one or more of the archived files according to the optimized schedule. In examples in which optional step 506 is not performed, the archive node computing device 20 can proceed back to step 508 and effectively wait for another request to be received from the analytics tier 12.

If the archive node computing device 20 determines in step 512 that more archived files are not required to service the job, then the No branch is taken back to step 500 and the archive node computing device receives an indication of archived files required to service another job, as described and illustrated earlier. In some examples, the archive node computing device 20 can also receive another indication of archived files from the same or a different master compute node computing device in parallel with performing any of steps 502-512.

Referring back to step 508, if the archive node computing device 20 determines that a request for one of the archived files has not been received, then the No branch is taken back to step 506. Accordingly, in this example, the archive node computing device 20 effectively prefetches archived files according to the optimized schedule until a request is determined to have been received from the analytics tier 12 in step 508. In examples in which optional step 506 is not performed, the archive node computing device 20 can take the No branch from step 508 back to step 508 and effectively wait for a request to be received from the analytics tier 12.

Figure 6:
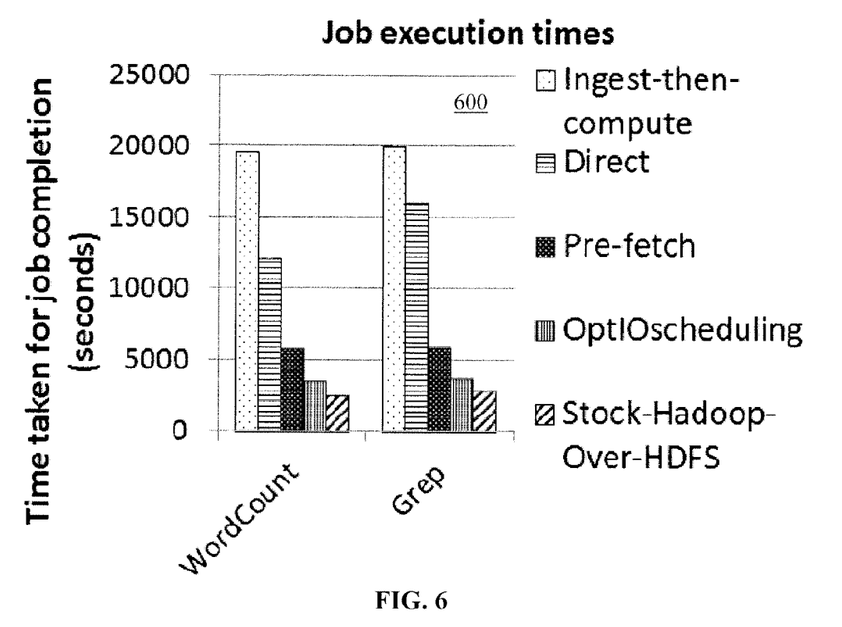
FIG. 6 is a bar graph illustrating execution times of various executions of a job as compared to an exemplary execution of the job with an exemplary implementation of the invention described and illustrated herein.

Referring more specifically to FIG. 6, a bar graph 600 illustrating execution times of various executions of a job as compared to an exemplary execution of the job with an exemplary implementation of the invention described and illustrated herein (referred to in FIG. 6 as "OptIOscheduling") is illustrated. In addition to OptIOscheduling, The methods of executing the job illustrated in the bar graph 600 include ingest-then-compute, direct, pre-fetch, and stock-Hadoop-over-RDFS. In the ingest-then-compute method, archived files required to service the job are all ingested by the analytics tier prior to the required computations being executed on the archived files. As ingest-then-compute has a dedicated ingest phase rather than retrieving archived files on demand, the ingest-then-compute method resulted in the longest time for job completion in this example.

In the direct method of executing the job, the archived files are retrieved by the analytics tier on demand as needed during execution of the job by the analytics tier. As the direct method does not have a dedicated ingest phase, the direct method required less time to complete the job than the ingest-then-compute method. In the pre-fetch method of executing the job, the order in which the analytics tier will retrieve archived files is communicated to the archive tier so that archived files can be prefetched. Although the archived files are retrieved in a first-come-first-serve order, prefetching the archived files resulted in a significant improvement in job completion time as compared to the direct and ingest-then-compute methods.

In the stock-Hadoop-over-HDFS method, the job is completed without retrieving any archived files and all of the files required to service the job reside in the analytics tier. Accordingly, in this exemplary execution, the stock-Hadoop-over-HDFS method executed the job on pre-ingested files and is essentially the ingest-then-compute method without the dedicated ingest phase. Accordingly, OptIOscheduling resulted in a shorter completion time for the job than ingest-then-compute, direct, and pre-fetch methods and a longer completion time than the stock-Hadoop-over-HDFS method in which none of the files required to service the job were currently archived.

Figure 7:
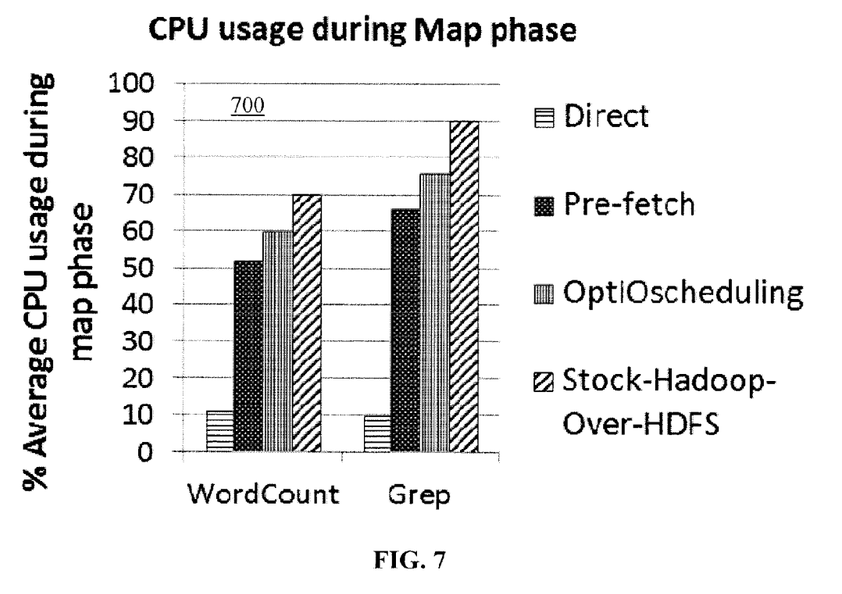
FIG. 7 is a bar graph illustrating central processing unit (CPU) usage during the map phase of various executions of a job as compared to an exemplary execution of the job with an exemplary implementation of the invention described and illustrated herein.

FIG. 7 is a bar graph 700 illustrating central processing unit (CPU) usage during the map phase of various executions of a job as compared to an exemplary execution of the job with the OptIOscheduling method described and illustrated herein. As illustrated in the bar graph 700, OptIOscheduling resulted in better CPU utilization and less CPU idle time than the direct and pre-fetch methods of executing the job described and illustrated earlier but worse CPU utilization and more CPU idle time than the stock-Hadoop-over-HDFS method described and illustrated earlier in which none of the files required to service the job were currently archived.

Accordingly, with this technology, batch analytics can be run more efficiently when archived files are required to service batch analytics jobs. An analytics tier is advantageously provided direct access to indications of the archived files, which are used to communicate a subset of the archived files required to service a current job to the archive tier. With the communicated information, the archive tier can generate and send an optimized schedule for the analytics tier to retrieve the archived files, and optionally begin prefetching the archived files based on the schedule. With the optimized schedule and optional prefetching, the analytics tier can retrieve the archived files more efficiently, resulting in reduced overhead, improved resource utilization, and lower job completion times.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating batch analytics on archived data, the method comprising:
   receiving, by an archive node computing device, an indication of each of a plurality of archived files required to service a job from one of a plurality of compute node computing devices of an analytics tier;
   generating, by the archive node computing device, an optimized schedule for retrieving the archived files from one or more archive storage devices of an archive tier; wherein the optimized schedule is generated based on at least one of whether one or more of the archive storage devices is hosting an increased number of the archived files, a seek location of one or more of the archived files hosted by a same one of the archive storage devices, whether one or more of the archive storage devices is currently active, or a load on one or more of the archive storage devices;
   providing, by the archive node computing device, the optimized schedule to the one of the plurality of compute node computing devices; and
   servicing, by the archive node computing device, requests for the archived files received from the one of the plurality of compute node computing device and at least one other of the plurality of compute node computing devices, wherein the requests are sent according to the optimized schedule.

2. The method of claim 1, providing, by the archive node computing device, access to a portion of a memory to one or more of the compute node computing devices, wherein the portion of the memory is mounted by the one or more of the compute node computing devices and stores an indication of at least each of the archived files.

3. The method of claim 1, further comprising prefetching, by the archive node computing device, one or more of the archived files according to the optimized schedule and prior to receiving one or more of the requests for the archived files from the one or more of the compute node computing devices.

4. An archive node computing device, comprising:
   a processor coupled to a memory and configured to execute programmed instructions stored in the memory to perform steps comprising:
   receiving an indication of each of a plurality of archived files required to service a job from one of a plurality of compute node computing devices of an analytics tier;
   generating an optimized schedule for retrieving the archived files from one or more archive storage devices of an archive tier; wherein the optimized schedule is generated based on at least one of whether one or more of the archive storage devices is hosting an increased number of the archived files, a seek location of one or more of the archived files hosted by a same one of the archive storage devices, whether one or more of the archive storage devices is currently active, or a load on one or more of the archive storage devices;
   providing the optimized schedule to the one of the plurality of compute node computing devices; and
   servicing requests for the archived files received from the one of the plurality of compute node computing device and at least one other of the plurality of compute node computing devices, wherein the requests are sent according to the optimized schedule.

5. The device of claim 4, wherein the processor is further configured to execute programmed instructions stored in the memory to perform steps further comprising providing access to a portion of the memory to one or more of the compute node computing devices, wherein the portion of the memory is mounted by the one or more of the compute node computing devices and stores an indication of at least each of the archived files.

6. The device of claim 4, wherein the processor is further configured to execute programmed instructions stored in the memory to perform steps further comprising prefetching one or more of the archived files according to the optimized schedule and prior to receiving one or more of the requests for the archived files from the one or more of the compute node computing devices.

7. A non-transitory computer readable medium having stored thereon instructions for facilitating batch analytics on archived data comprising executable code which when executed by a processor, causes the processor to perform steps comprising:
   receiving an indication of each of a plurality of archived files required to service a job from one of a plurality of compute node computing devices of an analytics tier;

generating an optimized schedule for retrieving the archived files from one or more archive storage devices of an archive tier;

providing the optimized schedule to the one of the plurality of compute node computing devices; wherein the optimized schedule is generated based on at least one of whether one or more of the archive storage devices is hosting an increased number of the archived files, a seek location of one or more of the archived files hosted by a same one of the archive storage devices, whether one or more of the archive storage devices is currently active, or a load on one or more of the archive storage devices; and servicing requests for the archived files received from the one of the plurality of compute node computing device and at least one other of the plurality of compute node computing devices, wherein the requests are sent according to the optimized schedule.

8. The medium of claim 7, wherein the executable code when executed by the processor further causes the processor to perform steps further comprising providing access to a portion of a memory to one or more of the compute node computing devices, wherein the portion of the memory is mounted by the one or more of the compute node computing devices and stores an indication of at least each of the archived files.

9. The medium of claim 7, wherein the executable code when executed by the processor further causes the processor to perform steps further comprising prefetching one or more of the archived files according to the optimized schedule and prior to receiving one or more of the requests for the archived files from the one or more of the compute node computing devices.

10. A method for facilitating batch analytics on archived data, the method comprising:

receiving, by a compute node computing device, a job to be performed on a plurality of files;

determining, by the compute node computing device, when a subset of the files includes archived files stored in an archive tier;

sending, by the compute node computing device, an indication of each of the subset of the files to an archive node computing device, when the subset of the files is determined to include archived files stored in an archive tier;

receiving, by the compute node computing device and from the archive node computing device, an optimized schedule for retrieving the subset of the files;

servicing, by the compute node computing device, the job at least in part by utilizing at least one or more other compute node computing devices to retrieve the subset of the files according to the optimized schedule; and servicing, by the compute node computing device, the job from an analytics tier and utilizing the at least one or more other compute node computing devices, when a subset of the files are not determined to be archived files stored in the archive tier.

11. The method of claim 10, wherein the determining further comprises comparing an indication of each of the files to an indication of each of a plurality of archived files to identify any matches, wherein the indications of the archived files are stored in a mounted portion of a memory of the archive node computing device.

12. A compute node computing device, comprising:

a processor coupled to a memory and configured to execute programmed instructions stored in the memory to perform steps comprising:

receiving a job to be performed on a plurality of files; determining when a subset of the files includes archived files stored in an archive tier;

sending an indication of each of the subset of the files to an archive node computing device, when the subset of the files is determined to include archived files stored in an archive tier;

receiving, from the archive node computing device, an optimized schedule for retrieving the subset of the files;

servicing the job at least in part by utilizing at least one or more other compute node computing devices to retrieve the subset of the files according to the optimized schedule; and servicing the job from an analytics tier and utilizing the at least one or more other compute node computing devices, when a subset of the files are not determined to be archived files stored in the archive tier.

13. The device of claim 12, wherein the determining further comprises comparing an indication of each of the files to an indication of each of a plurality of archived files to identify any matches, wherein the indications of the archived files are stored in a mounted portion of a memory of the archive node computing device.

14. A non-transitory computer readable medium having stored thereon instructions for facilitating batch analytics on archived data comprising executable code which when executed by a processor, causes the processor to perform steps comprising:

receiving a job to be performed on a plurality of files; determining when a subset of the files includes archived files stored in an archive tier;

sending an indication of each of the subset of the files to an archive node computing device, when the subset of the files is determined to include archived files stored in an archive tier;

receiving, from the archive node computing device, an optimized schedule for retrieving the subset of the files;

servicing the job at least in part by utilizing at least one or more other compute node computing devices to retrieve the subset of the files according to the optimized schedule; and servicing the job from an analytics tier and utilizing the at least one or more other compute node computing devices, when a subset of the files are not determined to be archived files stored in the archive tier.

15. The medium of claim 14, wherein the determining further comprises comparing an indication of each of the files to an indication of each of a plurality of archived files to identify any matches, wherein the indications of the archived files are stored in a mounted portion of a memory of the archive node computing device.

* * * * *